United States Patent
Ono et al.

(10) Patent No.: US 10,975,552 B2
(45) Date of Patent: Apr. 13, 2021

(54) CONTROL SYSTEM AND METHOD FOR WORK VEHICLE

(71) Applicant: KOMATSU LTD., Tokyo (JP)

(72) Inventors: Yutaka Ono, Tokyo (JP); Akihiko Sakamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 388 days.

(21) Appl. No.: 16/087,740

(22) PCT Filed: Aug. 22, 2017

(86) PCT No.: PCT/JP2017/029913
§ 371 (c)(1),
(2) Date: Sep. 24, 2018

(87) PCT Pub. No.: WO2018/051742
PCT Pub. Date: Mar. 22, 2018

(65) Prior Publication Data
US 2019/0106862 A1  Apr. 11, 2019

(30) Foreign Application Priority Data

Sep. 16, 2016 (JP) .............................. JP2016-181388

(51) Int. Cl.
*E02F 3/84* (2006.01)
*E02F 9/26* (2006.01)
*E02F 3/76* (2006.01)
*E02F 9/20* (2006.01)
*G05D 1/02* (2020.01)

(52) U.S. Cl.
CPC ................ *E02F 9/262* (2013.01); *E02F 3/76* (2013.01); *E02F 3/764* (2013.01); *E02F 3/7645* (2013.01); *E02F 3/842* (2013.01); *E02F 3/844* (2013.01); *E02F 9/20* (2013.01); *G05D 1/0219* (2013.01); *G05D 1/0242* (2013.01); *G05D 1/0257* (2013.01); *G05D 1/0278* (2013.01); *G05D 2201/0202* (2013.01)

(58) Field of Classification Search
CPC . E02F 3/841; E02F 3/842; E02F 3/844; E02F 3/847; E02F 9/2025; E02F 9/262
See application file for complete search history.

(56) References Cited

U.S. PATENT DOCUMENTS 6,088,644 A  7/2000  Brandt et al.
9,051,711 B2 *  6/2015  Sharma ................. E02F 9/2087
(Continued)

FOREIGN PATENT DOCUMENTS

CN  2900630 Y  5/2007
CN  103249895 A  8/2013
(Continued)

*Primary Examiner* — Gary S Hartmann
(74) *Attorney, Agent, or Firm* — Faegre Drinker Biddle & Reath LLP

(57) ABSTRACT

A control system for a work vehicle having a work implement, the control system including: a position measurement unit for measuring a position of a windrow produced by grading work; a work route setting unit for setting a work route based on the position of the windrow that has been measured by the position measurement unit; and a travel control unit for controlling the work vehicle to travel along the work route that has been set by the work route setting unit.

19 Claims, 16 Drawing Sheets

(56) References Cited

U.S. PATENT DOCUMENTS

| | | | |
|---|---|---|---|
| 9,234,329 B2 * | 1/2016 | Jaliwala | E02F 3/847 |
| 9,303,386 B2 * | 4/2016 | Schmidt | E02F 3/325 |
| 10,198,010 B2 * | 2/2019 | Hiramatsu | G05D 1/0293 |
| 2015/0066298 A1 | 3/2015 | Sharma et al. | |
| 2015/0240453 A1 | 8/2015 | Jaliwala et al. | |
| 2018/0181143 A1 | 6/2018 | Hiramatsu | |
| 2020/0048870 A1 * | 2/2020 | Peat | E02F 9/264 |
| 2020/0217660 A1 * | 7/2020 | Beery | G01C 9/06 |

FOREIGN PATENT DOCUMENTS

| | | |
|---|---|---|
| JP | H01-231807 A | 9/1989 |
| JP | 2001-262611 A | 9/2001 |
| JP | 2004-076499 A | 3/2004 |
| JP | 2009-209681 A | 9/2009 |
| JP | 2010-242345 A | 10/2010 |
| JP | 2013-201958 A | 10/2013 |
| WO | WO 2012/051087 A2 | 4/2012 |
| WO | WO 2015/147108 A1 | 10/2015 |

* cited by examiner

CONTROL SYSTEM AND METHOD FOR WORK VEHICLE

TECHNICAL FIELD

The present invention relates to a control system for a work vehicle, a method for controlling a control system for a work vehicle, and a work vehicle, and in particular to a work route of a motor grader.

BACKGROUND ART

Conventionally, a repair vehicle for repairing a road surface has been known. A common example of such a repair vehicle is a motor grader having a blade.

For example, Japanese Patent Laying-Open No. 2010-242345 discloses a method for detecting a condition of a road surface using a sensor provided in a dump truck, and repairing the road surface using a repair vehicle based on information of the detected condition of the road surface.

CITATION LIST

Patent Literature

PTL 1: Japanese Patent Laying-Open No. 2010-242345

SUMMARY OF INVENTION

Technical Problem

On the other hand, the motor grader has a blade, and windrows are formed on the lateral sides of the motor grader during grading work for repairing a road surface using the blade.

Therefore, it is required to appropriately perform land grading of the windrows during the grading work.

In view of the above circumstances, an object of the present invention is to provide a work system, a method for controlling the work system, and a work vehicle, capable of appropriately performing land grading of windrows produced by grading work.

Solution to Problem

According to one aspect, a control system for a work vehicle includes: a position measurement unit for measuring a position of a windrow produced by grading work; a work route setting unit for setting a work route based on the position of the windrow that has been measured by the position measurement unit; and a travel control unit for controlling the work vehicle to travel along the work route that has been set by the work route setting unit.

Preferably, the position measurement unit is provided in the work vehicle.

Preferably, the work route setting unit sets a work route along which the position of the windrow is located within a work range of the work implement.

Preferably, the control system further includes a work implement control unit for controlling the work implement along the work route set by the work route setting unit, based on the position of the windrow that has been measured by the position measurement unit.

Preferably, the position measurement unit further measures a width of the windrow, and the work implement control unit controls the work implement based on the width of the windrow.

Preferably, the position measurement unit further measures a height of the windrow, and the work implement control unit controls the work implement based on the height of the windrow.

Preferably, the control system further includes a communication unit for transmitting information to an external device, the information relating to the windrow that has been measured by the position measurement unit.

According to one aspect, a method for controlling a control system for a work vehicle having a work implement includes the steps of: measuring a position of a windrow produced by grading work; setting a work route based on the position of the windrow that has been measured; and controlling the work vehicle to travel along the work route that has been set.

Preferably, the setting the route sets a work route along which the position of the windrow is located within a work range of the work implement.

Preferably, the method further includes the step of controlling the work implement along the work route having been set, based on the position of the windrow that has been measured.

Preferably, the step of measuring includes a step of further measuring a width of the windrow. The step of controlling the work implement includes a step of controlling the work implement based on the width of the windrow.

Preferably, the step of measuring includes a step of further measuring a height of the windrow. The step of controlling the work implement includes a step of controlling the work implement based on the height of the windrow.

Preferably, the method further includes the step of transmitting information to an external device, the information relating to the windrow that has been measured.

According to one aspect, a work vehicle includes: a work implement; a position measurement unit for measuring a position of a windrow produced by grading work; a work route setting unit for setting a work route based on the position of the windrow that has been measured by the position measurement unit; and a travel control unit for controlling the work vehicle to travel along the work route that has been set by the work route setting unit.

Preferably, the work route setting unit sets a work route along which the position of the windrow is located within a work range of the work implement.

Preferably, the work vehicle further includes a work implement control unit for controlling the work implement along the work route set by the work route setting unit, based on the position of the windrow that has been measured by the position measurement unit.

Preferably, the position measurement unit further measures a width of the windrow, and the work implement control unit controls the work implement based on the width of the windrow.

Preferably, the position measurement unit further measures a height of the windrow, and the work implement control unit controls the work implement based on the height of the windrow.

Preferably, the work vehicle further includes a communication unit for transmitting information to an external device, the information relating to the windrow that has been measured by the position measurement unit.

Advantageous Effects of Invention

According to the present invention, it is possible to appropriately perform land grading of windrows produced by grading work.

DESCRIPTION OF EMBODIMENTS

Figure 1:
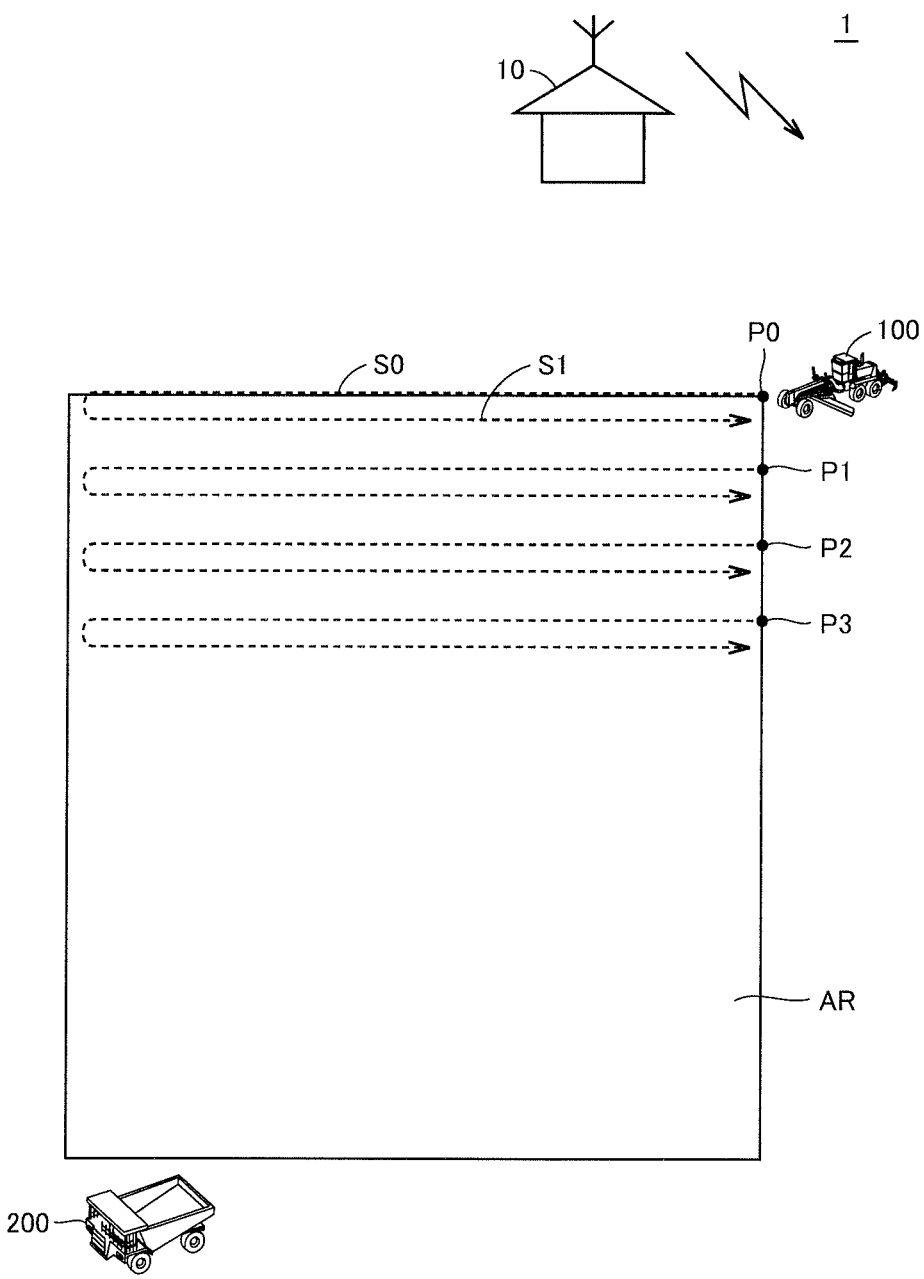
FIG. 1 is a diagram illustrating an outline of a control system 1 of a work vehicle according to a first embodiment.

Hereinafter, embodiments will be described with reference to the drawings. In the following description, like components are represented by like reference numerals. Names and functions of these components are also the same. Therefore, details of these components will not be described repeatedly.

First Embodiment

<A. Entire System Configuration>

FIG. 1 is a diagram illustrating an outline of a control system 1 of a work vehicle according to a first embodiment.

As illustrated in FIG. 1, control system 1 of the work vehicle includes a base station 10, a work vehicle 100, and a dump truck 200. Further, a land grading area AR is shown, and in this example, work vehicle 100 performs grading work taking each of points P0, P1, P2, and P3 in land grading area AR as a point of origin. A position of each of points P0, P1, P2, and P3 of land grading area AR is set based on information from base station 10.

For example, a work vehicle starting grading work from point P0 performs the grading work along work routes S0 and S1. This also applies to the other points.

In this example, a motor wader is described as one example of work vehicle 100.

Figure 2:
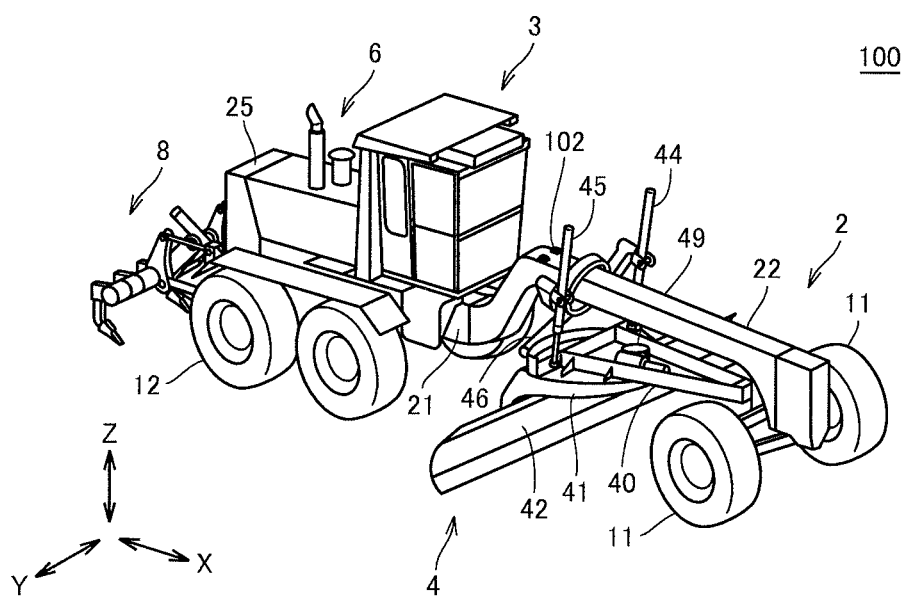
FIG. 2 is a perspective view schematically illustrating a configuration of a work vehicle 100 according to the first embodiment.

FIG. 2 is a perspective view schematically illustrating a configuration of work vehicle 100 according to the first embodiment.

Figure 3:
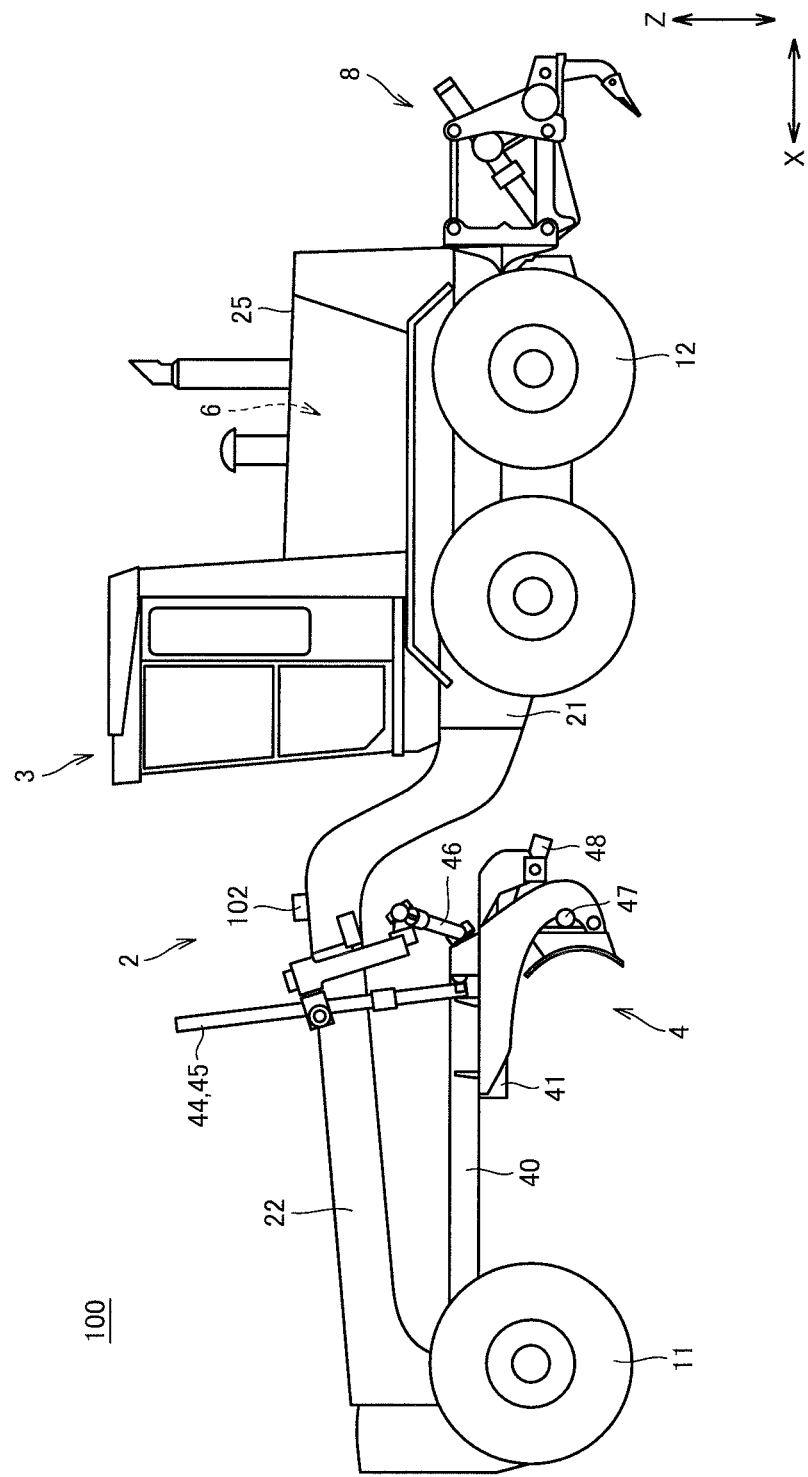
FIG. 3 is a side view schematically illustrating a configuration of work vehicle 100 according to the first embodiment.

FIG. 3 is a side view schematically illustrating a configuration of work vehicle 100 according to the first embodiment.

Referring to FIGS. 2 and 3, work vehicle 100 according to the first embodiment mainly includes front wheels 11 as running wheels, rear wheels 12 as running wheels, a vehicular body frame 2, an operator's cab 3, a work implement 4, and a ripper apparatus 8. Further, work vehicle 100 also includes components such as an engine arranged in an engine compartment 6. Work implement 4 includes a blade 42.

Work vehicle 100 can perform various works such as grading work, snow-removal work, light cutting, and material mixture using blade 42.

While the running wheels including front wheel 11 on each side and rear wheel 12 on each side are shown, the number and arrangement of the front wheels and the rear wheels are not limited to this example.

In the following description of the drawings, a direction along which work vehicle 100 travels straightly is referred to as a fore/aft direction of work vehicle 100. Along the fore/aft direction of work vehicle 100, a side on which front wheels 11 are located with respect to work implement 4 is referred to as a fore direction. Along the fore/aft direction of work vehicle 100, a side on which rear wheels 12 are located with respect to work implement 4 is referred to as an aft direction. A right/left direction, or a lateral direction, of work vehicle 100 is a direction orthogonal to the fore/aft direction in a planar view. A right side and a left side with respect to the right/left direction when facing the fore direction respectively correspond to a right direction and a left direction. An up/down direction of work vehicle 100 is a direction orthogonal to a plane defined by the fore/aft direction and the right/left direction. With respect to the up/down direction, a down direction is an earthward side, and an up direction is a skyward side.

In the following drawings, the fore/aft direction is indicated by an arrow X, the right/left direction is indicated by an arrow Y, and the up/down direction is indicated by an arrow Z.

Vehicular body frame 2 includes a rear frame 21 and a front frame 22. Rear frame 21 includes an exterior cover 25, and components such as an engine arranged in engine compartment 6. Exterior cover 25 covers engine compartment 6.

To front frame 22, a position measurement unit 102 is attached. Position measurement unit 102 is provided so as to be capable of measuring a condition on the lateral side of work vehicle 100. With this, it is possible to easily measure windrows formed on the lateral side of work vehicle 100.

A position at which position measurement unit 102 is attached is not limited to the above position, and may be any position at which it is possible to measure windrows formed on the lateral side of work vehicle 100 or on the lateral side of blade 42. For example, position measurement unit 102 may be provided on an upper surface of operator's cab 3.

To rear frame 21, each of two rear wheels 12, for example, is attached so as to be rotatably driven by a driving force of the engine. Front frame 22 is attached on the front side of rear frame 21. To the front end portion of front frame 22, each of two front wheels 11, for example, is attached so as to be rotatably driven. In this example, a rear-wheel-drive system is taken as one example, but it is possible to employ an all-wheel-drive system in which each of front wheels 11 and rear wheels 12 is rotatively driven by a driving force of the engine.

Operator's cab 3 has an interior space in which an operator gets on, and is located in front of rear frame 21. Note that, operator's cab 3 may be located on the front frame 22 side.

Within operator's cab 3, operating portions such as a handle for swing operation, shift lever, a control lever of work implement 4, a brake, an accelerator pedal, and the like are provided.

By operating the handle, an orientation of front wheel 11 may be changed.

Ripper apparatus 8 is a work implement for performing excavation work and the like of the ground, and attached to a rear end of a vehicular body unit.

While a configuration with operator's cab 3 is described in this example, it is possible to provide an autonomous work vehicle without operator's cab 3.

While an example in which the handle is operated for swing operation is described in this example, the present invention is not particularly limited to this example, and it is possible to provide a steering lever (also referred to as joystick steering) in place of the handle to perform swing operation by operating the lever. Alternatively, it is possible to employ a configuration in which both of the handle and the steering lever are provided.

Work implement 4 mainly includes a drawbar 40, a swing circle 41, blade 42, a hydraulic motor 49, and various cylinders 44 to 48.

A front end portion of drawbar 40 is swingably attached to a tip end of front frame 22. A rear end portion of drawbar 40 is supported on front frame 22 by a pair of lift cylinders 44 and 45. The rear end portion of drawbar 40 may be lifted up and down with respect to front frame 22 by expansion and contraction of the pair of lift cylinders 44 and 45. Therefore, it is possible to adjust the height of blade 42 with respect to front frame 22 and front wheel 11 upwardly by contraction of both of lift cylinders 44 and 45. In addition, it is possible to adjust the height of blade 42 with respect to front frame 22 and front wheel 11 downwardly by expansion of both of lift cylinders 44 and 45.

Further, drawbar 40 is capable of swinging upward and downward due to expansion and contraction of lift cylinders 44 and 45 in different manners centering an axis along a traveling direction of the vehicle.

Drawbar shift cylinder 46 is attached to front frame 22 and a side end of drawbar 40. By expansion and contraction of drawbar shift cylinder 46, drawbar 40 can move right and left with respect to front frame 22.

Swing circle 41 is attached so as to be capable of swinging (rotating) to the rear end portion of drawbar 40. Swing circle 41 may be swingably driven by hydraulic motor 49 in a clockwise direction or a counterclockwise direction with respect to drawbar 40 when viewed from above the vehicle. A blade angle of blade 42 may be adjusted by swing driving of swing circle 41.

The blade angle will be described later.

Blade 42 is arranged between front wheel 11 and rear wheel 12. Blade 42 is arranged between a front end of vehicular body frame 2 (or a front end of front frame 22) and a rear end of vehicular body frame 2. Blade 42 is supported by swing circle 41. Blade 42 is supported on front frame 22 via swing circle 41 and drawbar 40.

Blade 42 is movably supported in the right/left direction with respect to swing circle 41. Specifically, blade shift cylinder 47 is attached to swing circle 41 and blade 42, and disposed along a longitudinal direction of blade 42. By blade shift cylinder 47, blade 42 can move in the right/left direction with respect to swing circle 41. Blade 42 can move in a direction intersecting with a longitudinal direction of front frame 22.

Blade 42 is swingably supported, with respect to swing circle 41, centering an axis along the longitudinal direction of blade 42. Specifically, tilt cylinder 48 is attached to swing circle 41 and blade 42. By expansion and contraction of tilt cylinder 48, blade 42 can swing centering the axis along the longitudinal direction of blade 42 with respect to swing circle 41, so as to change an inclination angle of blade 42 with respect to the traveling direction of the vehicle.

As described above, blade 42 is configured, via drawbar 40 and swing circle 41, to move up and down with respect to the vehicle, to swing centering an axis along the traveling direction of the vehicle, to change the inclination angle with respect to the fore/aft direction, to move in the right/left direction, and to swing centering the axis along the longitudinal direction of blade 42.

<B: Grading Work>

Figure 4:
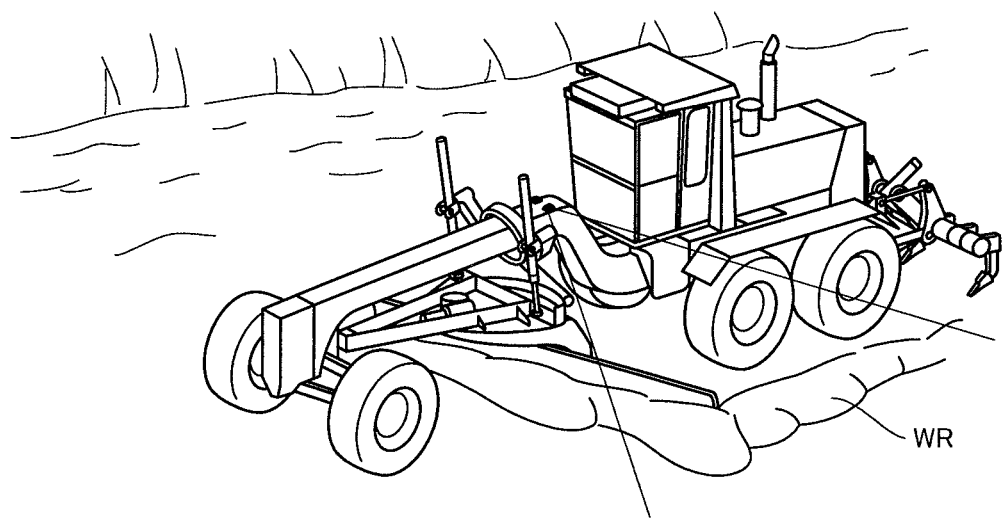
FIG. 4 is a view seen from the lateral side illustrating excavation work in grading work by work vehicle 100 according to the first embodiment.

FIG. 4 is a view seen from the lateral side illustrating excavation work in grading work by work vehicle 100 according to the first embodiment.

Figure 5:
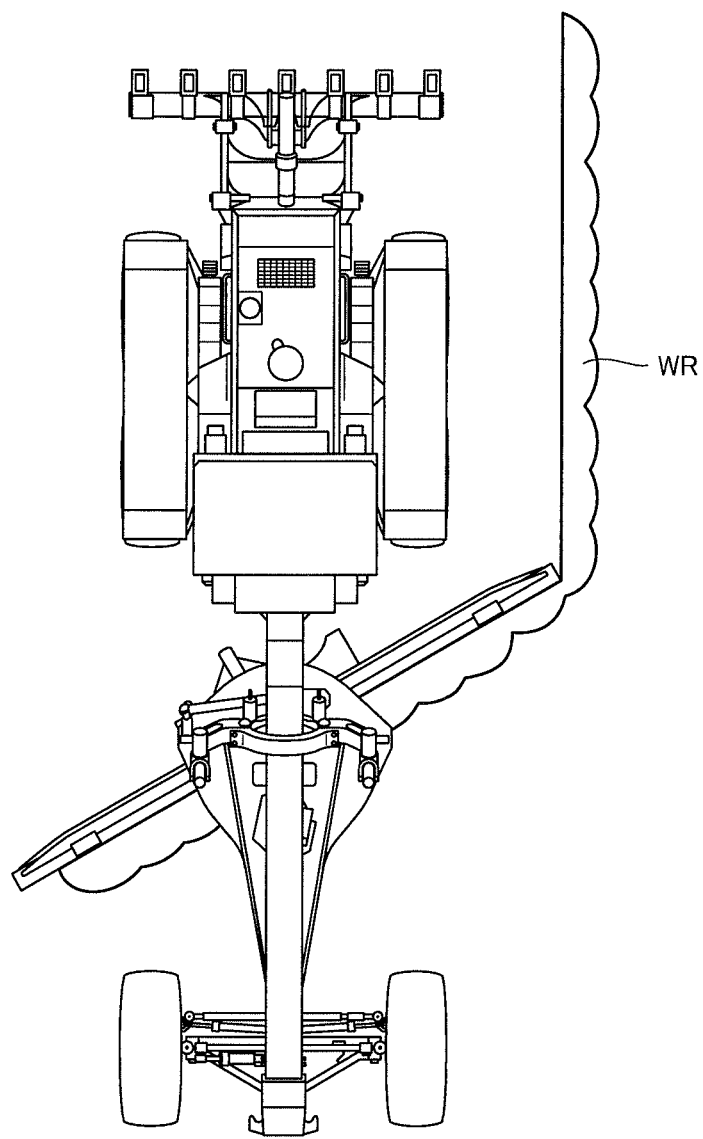
FIG. 5 is a view seen from the top illustrating excavation work in grading work by work vehicle 100 according to the first embodiment.

FIG. 5 is a view seen from the top illustrating excavation work in grading work by work vehicle 100 according to the first embodiment.

As illustrated in FIGS. 4 and 5, work vehicle 100 performs, as the grading work, excavation work for removing unevenness of a road surface of land grading area AR by blade 42. This excavation work produces a windrow WR on the lateral side of blade 42.

Further, as illustrated in FIG. 4, on an upper surface of front frame 22 of work vehicle 100, position measurement unit 102 is attached. Position measurement unit 102 measures a windrow WR produced on the lateral side of blade 42. As one example, position measurement unit 102 is a millimeter-wave sensor, having a radiation unit to emit a transmitter pulse to the road surface on the lateral side of blade 42 of work vehicle 100. Position measurement unit 102 also receives reflected wave from the road surface using a light receiving unit. In a case in which unevenness or an obstacle is present on the road surface, the reflected wave returns quickly if there is a projection, and the reflected wave returns slowly if there is a depression. By detecting a difference from returning time of the reflected wave when traveling on flat land, it is possible to detect a condition of the road surface. In this example, it is possible to detect windrow WR.

Position measurement unit 102 is not limited to the millimeter-wave sensor, and it is possible to employ a laser scanner that radiates a laser beam and receives reflected laser beam. Alternatively, it is possible to detect windrow WR using an imaging device such as a camera.

Figure 6:
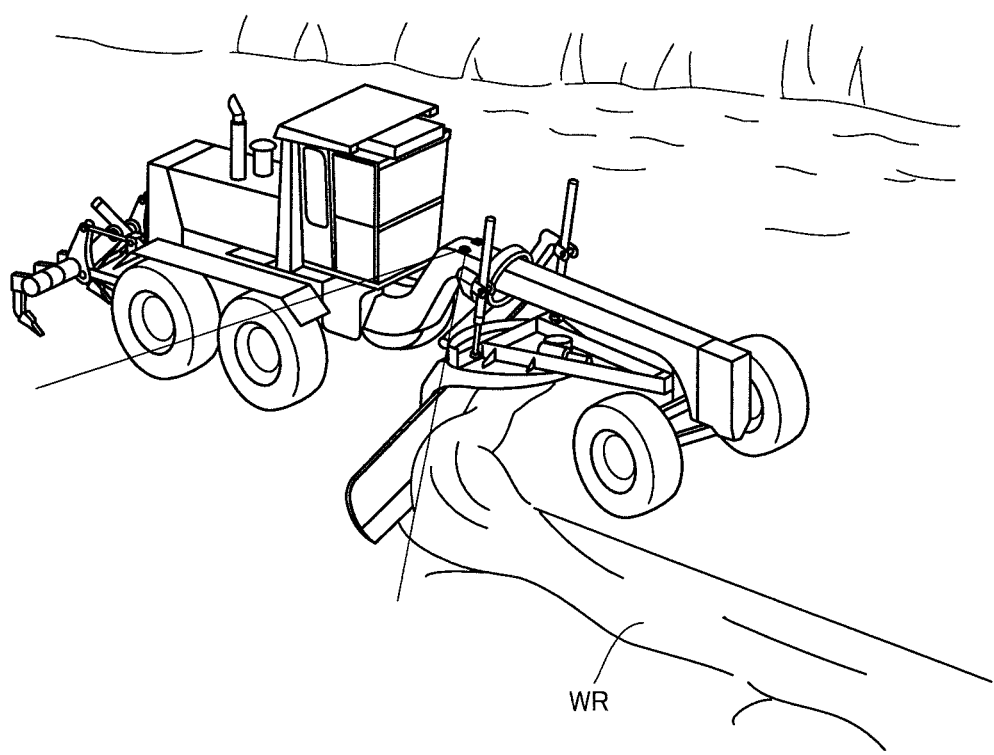
FIG. 6 is a view seen from the lateral side illustrating leveling work in grading work by work vehicle 100 according to the first embodiment.

FIG. 6 is a view seen from the lateral side illustrating leveling work in grading work by work vehicle 100 according to the first embodiment.

Figure 7:
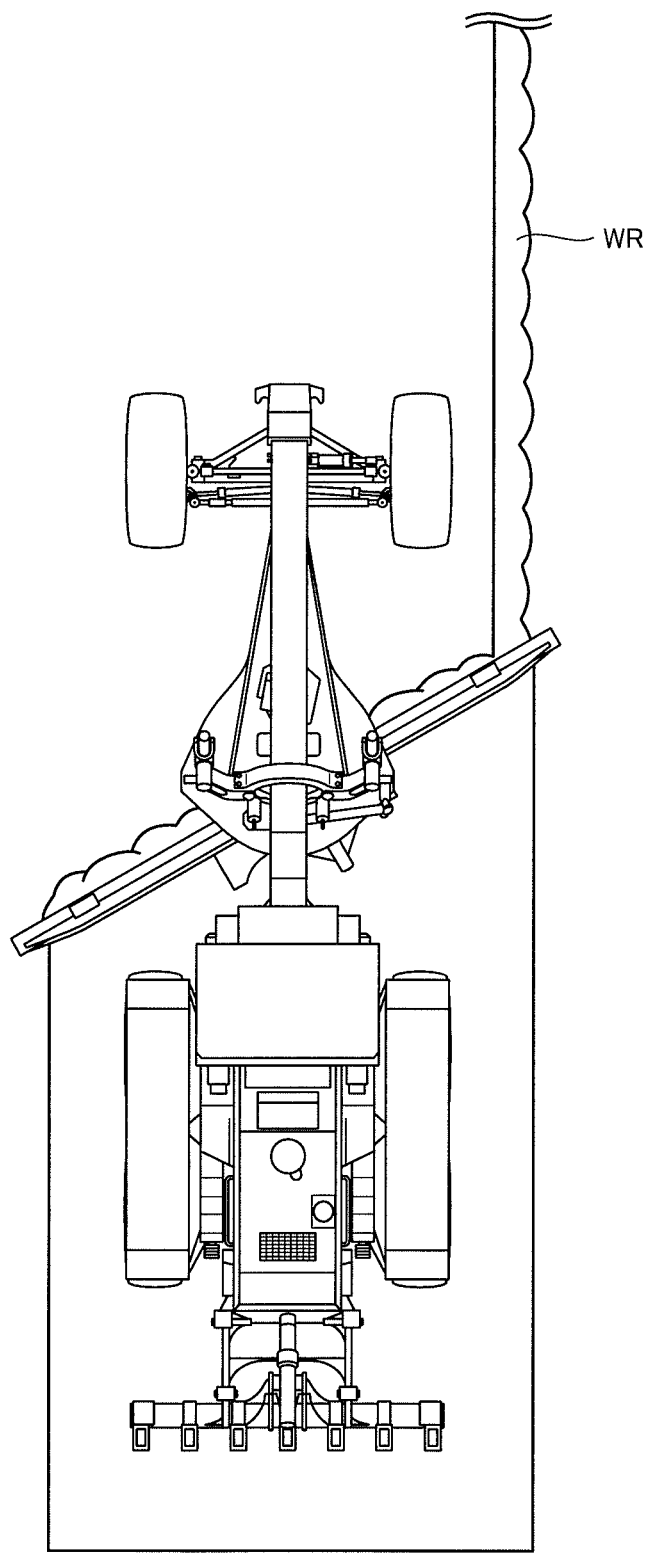
FIG. 7 is a view seen from the top illustrating leveling work in grading work by work vehicle 100 according to the first embodiment.

FIG. 7 is a view seen from the top illustrating leveling work in grading work by work vehicle 100 according to the first embodiment.

As illustrated in FIGS. 6 and. 7, work vehicle 100 performs, as the grading work, leveling work for flattening the road surface by leveling windrow WR produced during excavation work using blade 42.

Figure 8:
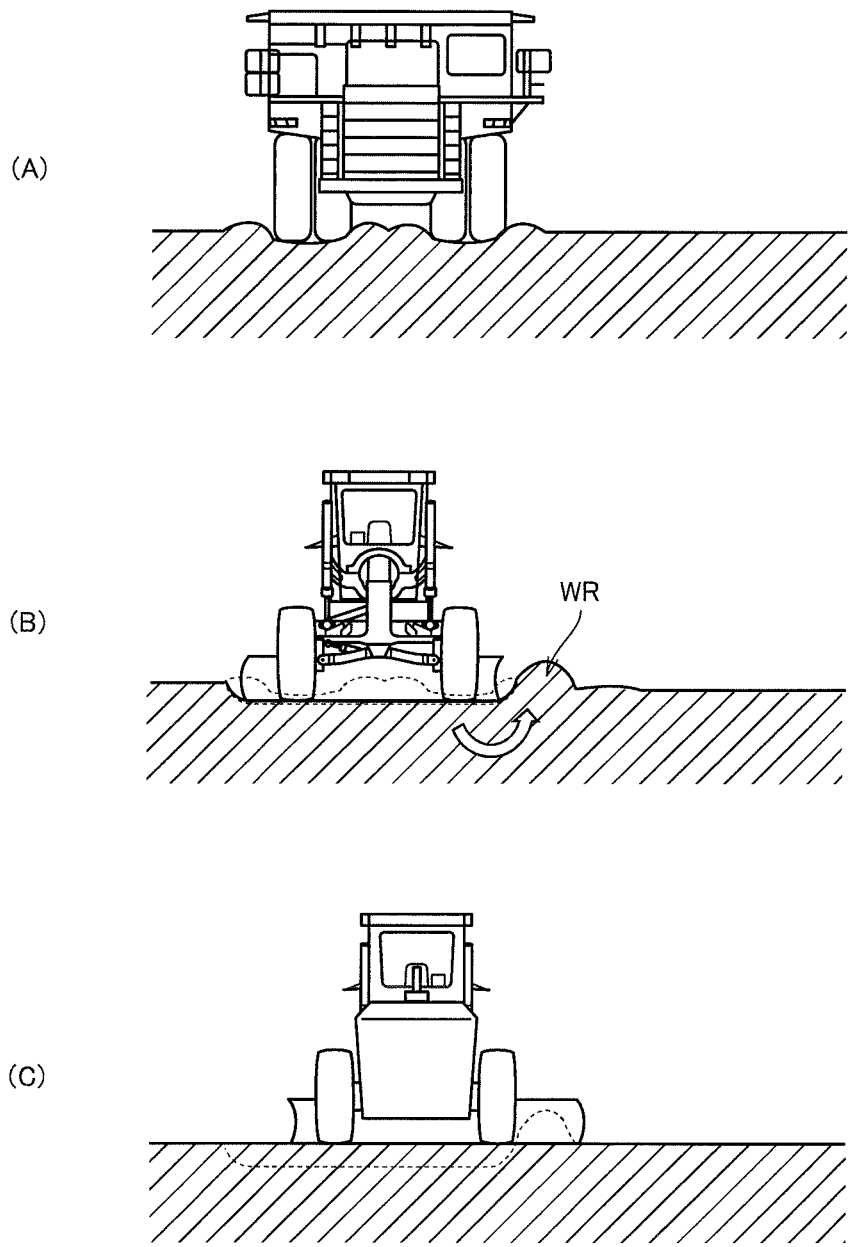
FIG. 8 shows views illustrating sectional shapes during grading work according to the first embodiment.

FIG. 8 shows views illustrating sectional shapes during the grading work according to the first embodiment.

As illustrated in FIG. 8(A), unevenness is generated on the road surface based on wheel tracks of wheels of a dump truck. Leaving the unevenness of the road surface results in various influences to the dump truck such as vibration and a travel resistance, and therefore it is necessary to perform the grading work for repairing the road surface as needed.

As illustrated in FIG. 8(B), work vehicle 100 performs, as the grading work, excavation work for removing unevenness of the road surface. At this time, the removed soil is formed into windrow WR on the lateral side of work vehicle 100. Further, the ground surface is slightly dug into from a grading surface due to excavation work.

As illustrated in FIG. 8(C), work vehicle 100 performs, as the grading work, leveling work for flattening by leveling windrow WR. At this time, flattening is performed by filling an area that has been dug during excavation work with the soil of windrow WR. This forms the grading surface. The grading work of land grading area AR is performed by repeating the above processes.

<C: Explanation of Operation>

Figure 9:
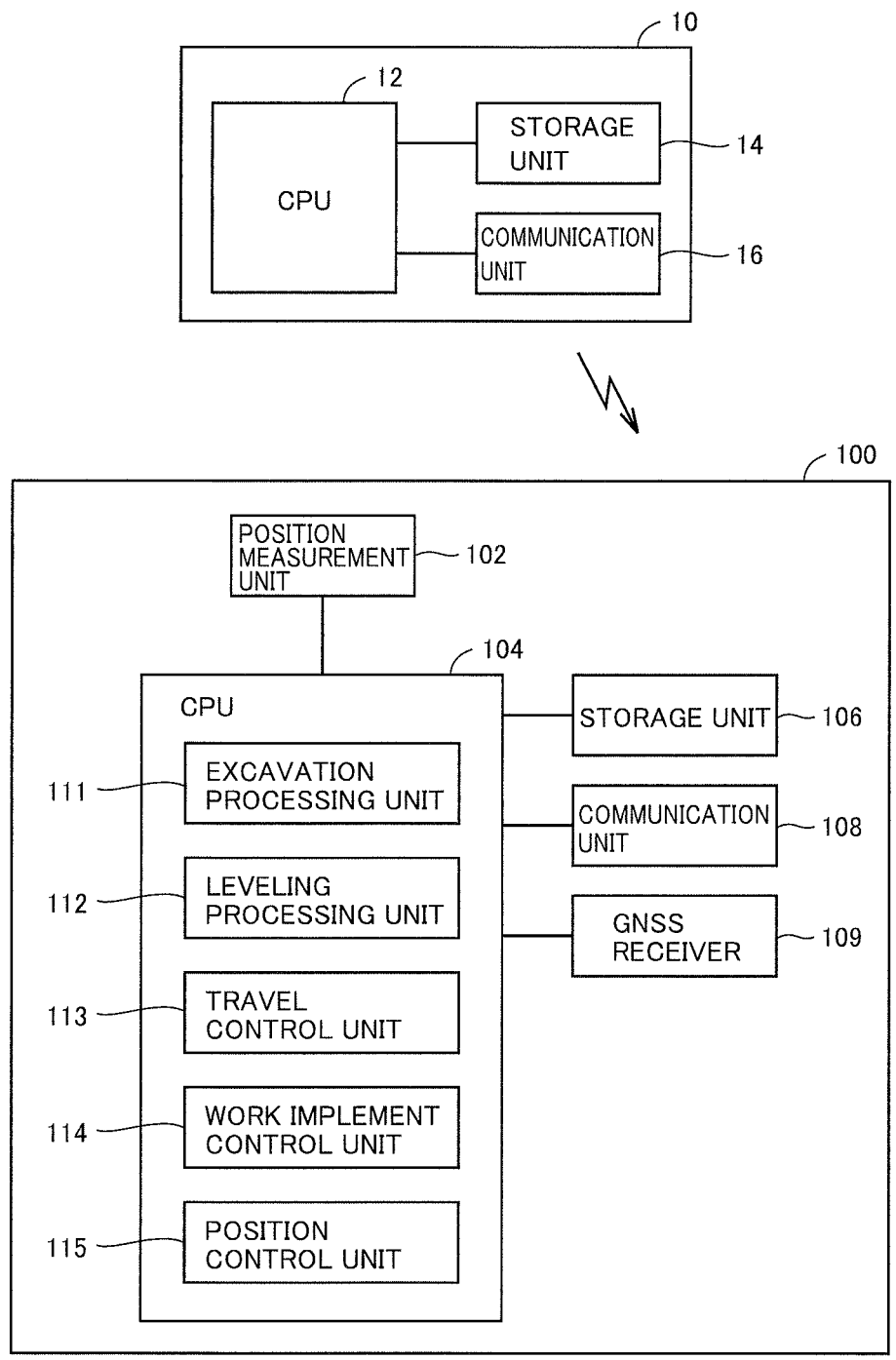
FIG. 9 is a diagram illustrating functional blocks of a base station 10 and work vehicle 100 according to the first embodiment.

FIG. 9 is a diagram illustrating functional blocks of base station 10 and work vehicle 100 according to the first embodiment.

As illustrated in FIG. 9, base station 10 includes a CPU (Central Processing Unit) 12, a storage unit 14, and a communication unit 16. Storage unit 14 stores various programs required for control system 1 of the work vehicle. CPU 12 executes various processes based on the programs stored in storage unit 14. As one example, CPU 12 transmits, via communication unit 16, information relating to land grading area AR for causing work vehicle 100 carry out grading work.

The information includes information relating to a range of land grading area AR, as well as information of points P that are points of origin to start land grading.

Work vehicle 100 includes position measurement unit 102, a CPU 104, a storage unit 106, a communication unit 108, and a GNSS (Global Navigation Satellite System) receiver 109. GNSS receiver 109 is an antenna for GPS (Global Positioning System), for example.

Storage unit 106 stores a program for executing various operations by work vehicle 100, and is used as an area for recording data that is required.

CPU 104 executes various processes based on the program stored in storage unit 106.

Position measurement unit 102 measures information relating to a condition of the road surface around work vehicle 100. Specifically, position measurement unit 102 measures information relating to the condition of the road surface on the lateral side of work vehicle 100. In this example, position measurement unit 102 measures a position of windrow WR produced by the grading work.

GNSS receiver 109 receives vehicular body position information indicating a position of work vehicle 100, and outputs the received information to CPU 104.

Communication unit 108 is provided so as to be able to communicate with base station 10, and receives information transmitted from base station 10, and outputs the received information to CPU 104. Further, according to an instruction from CPU 104, it is possible to transmit data to an external device via communication unit 108.

In this example, CPU 104 includes an excavation processing unit 111, a leveling processing unit 112, a travel control unit 113, a work implement control unit 114, and a position control unit 115.

Position control unit 115 obtains, via communication unit 108, information for land grading area AR and for points P transmitted from base station 10. Further, position control unit 115 obtains position information of work vehicle 100 from GNSS receiver 109. Position control unit 115 sets a range of grading work based on the information for land grading area AR. Moreover, position control unit 115 instructs travel control unit 113, based on the position information from GNSS receiver 109, to move work vehicle 100 to a position of one of points P. Travel control unit 113 executes, according to the instruction from position control unit 115, travel control for driving at least one of front wheels 11 and/or rear wheels 12 so that work vehicle 100 reaches point P.

Excavation processing unit 111 executes a process relating to grading work of land grading area AR, taking point P0 as a point of origin. Specifically, taking point P as a point of origin, excavation processing unit 111 sets excavation work route S0 in land grading area AR. Excavation processing unit 111 instructs travel control unit 113 to move along excavation work route S0 that has been set.

Travel control unit 113 causes work vehicle 100 to travel along excavation work route S0 that has been set by excavation processing unit 111.

Excavation processing unit 111 instructs work implement control unit 114, and work implement control unit 114 adjusts, according to the instruction from excavation processing unit 111, at least one of the inclination angle of the blade, movement of the blade in the right/left direction, and the blade angle in excavation work route S0.

The excavation work described above is performed by work vehicle 100 traveling along excavation work route S0.

When it is determined that traveling along excavation work route S0 is completed based on the position information from GNSS receiver 109, excavation processing unit 111 instructs leveling processing unit 112 to carry out leveling work.

Leveling processing unit 112 sets a leveling work route S1 in land grading area AR, taking one of points P as an ending point. Leveling processing unit 112 instructs travel control unit 113 to move along leveling work route S1 that has been set.

Travel control unit 113 causes work vehicle 100 to travel along leveling work route S1 that has been set by leveling processing unit 112.

Leveling processing unit 112 instructs work implement control unit 114, and work implement control unit 114 adjusts, according to the instruction from leveling processing unit 112, at least one of the inclination angle of the blade, movement of the blade in the right/left direction, and the blade angle in leveling work route S1.

The leveling work described above is performed by work vehicle 100 traveling along leveling work route S1.

When it is determined that traveling along leveling work route S1 is completed based on the position information from GNSS receiver 109, leveling processing unit 112 instructs excavation processing unit 111 to carry out excavation work. Excavation processing unit 111 performs excavation work from next point P1, and the above processes are repeated. With this, grading work for land grading area AR is sequentially performed.

<D: Flow>

Figure 10:
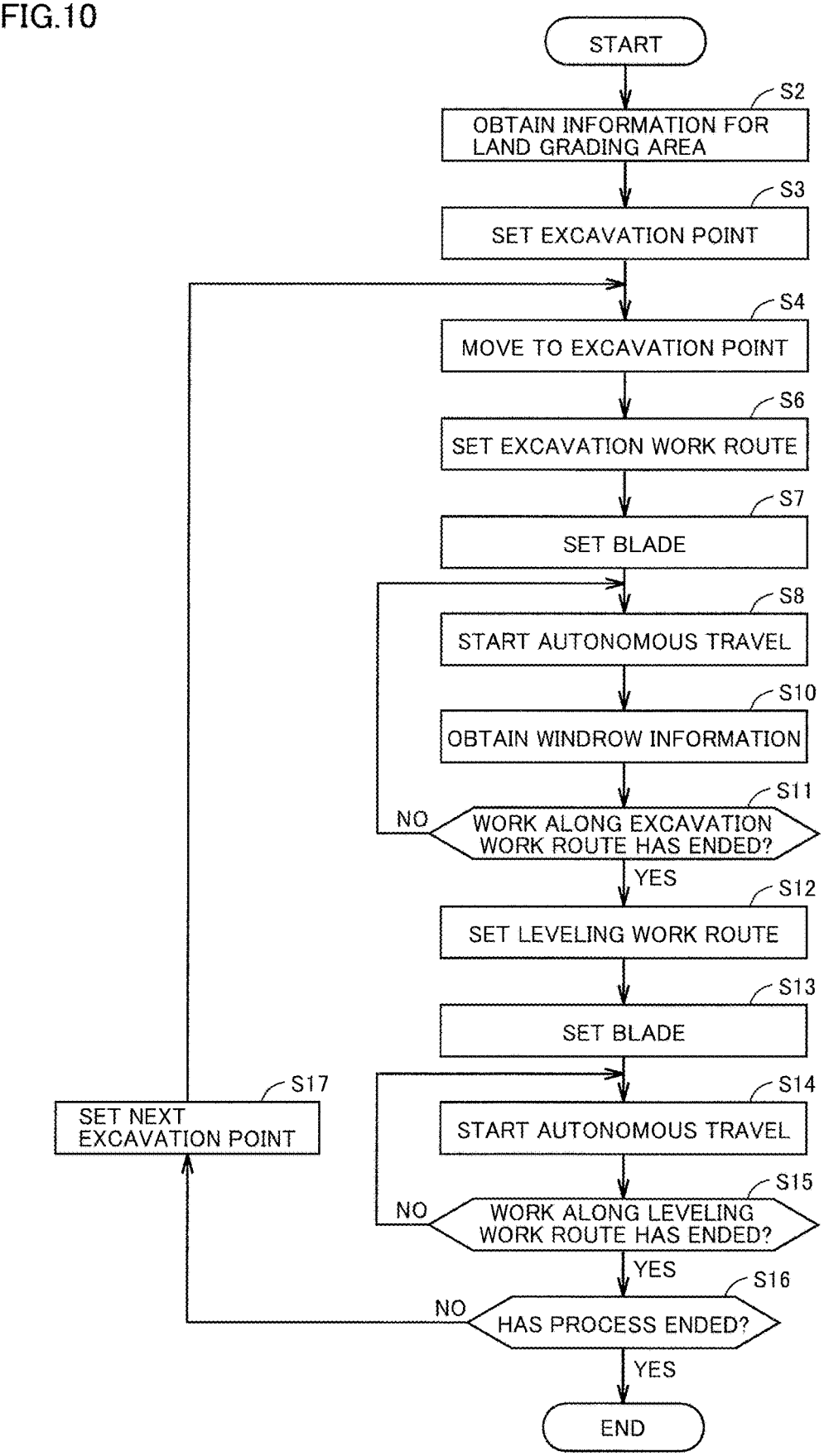
FIG. 10 is a diagram illustrating a flow for carrying out a land grading process by work vehicle 100 according to the first embodiment.

FIG. 10 is a diagram illustrating a flow for carrying out a land grading process by work vehicle 100 according to the first embodiment.

As illustrated in FIG. 10, work vehicle 100 obtains the information for land grading area AR (Step S2). Specifically, position control unit 115 obtains the information for land grading area AR via communication unit 108. Further, position control unit 115 also obtains, in addition to the information for land grading area AR, information for points P that are the point of origin of grading work.

Work vehicle 100 sets an excavation point (Step S3). Position control unit 115 sets the excavation point based on the obtained information. As one example, position control unit 115 sets point P0 as the excavation point.

Next, work vehicle 100 moves to the excavation point (Step S4). Position control unit 115 instructs travel control unit 113 to move to point P0. Travel control unit 113 executes, based on point P0 set by position control unit 115 and the information obtained by GNSS receiver 109, autonomous travel control for driving and moving at least one of front wheels 11 and/or rear wheels 12 to move work vehicle 100 to point P0.

Next, work vehicle 100 sets an excavation work route (Step S6). Taking point P0 as a point of origin, excavation processing unit 111 sets an excavation work route in land grading area AR. As one example, excavation work route S0 is set.

Next, work vehicle 100 sets the blade (Step S7). Excavation processing unit 111 instructs work implement control unit 114 to set the blade. According to the instruction from excavation processing unit 111, work implement control unit 114 adjusts at least one of the inclination angle of the blade, movement of the blade in the right/left direction, and the blade angle in excavation work route S0. As one example, work implement control unit 114 adjusts the blade angle so that windrow WR formed in the excavation work comes on the left side of work vehicle 100. The blade angle is adjusted such that a right end portion of blade 42 comes in the fore direction, and a left end portion of blade 42 comes in the aft direction with respect to the traveling direction of work vehicle 100.

Next, work vehicle 100 starts autonomous traveling (Step S8). Excavation processing unit 111 instructs travel control unit 113 to perform autonomous travel along excavation work route S0. Travel control unit 113 causes work vehicle 100 to travel along excavation work route S0.

Next, work vehicle 100 obtains windrow information (Step S10). Excavation processing unit 111 instructs position measurement unit 102, and position measurement unit 102 measures a windrow formed on the left side of work vehicle 100 that autonomously travels along excavation work route S0. Position measurement unit 102 outputs windrow information as a result of measurement to CPU 104.

Next, work vehicle 100 determines whether or not work along the excavation work route has been completed (Step S11). Travel control unit 113 carries out autonomous traveling along excavation work route S0, and notifies excavation processing unit 111 of the completion of the work when work vehicle 100 reaches an end of excavation work route S0. According to the notification from travel control unit 113, excavation processing unit 111 can determine that the work along the excavation work route has been completed.

In Step S11, if it is determined that the work along the excavation work route has not been completed (NO in Step S11), work vehicle 100 returns to Step S8, and the above processes are repeated.

On the other hand, in Step S11, when it is determined that the work along the excavation work route has been completed (YES in Step S11), work vehicle 100 sets a leveling work route (Step S12). Excavation processing unit 111 instructs leveling processing unit 112 to perform a leveling process. Leveling processing unit 112 sets a leveling work route in land grading area AR, taking point P0 as an ending point. In this example, a route including the windrow measured by position measurement unit 102 is set as the leveling work route. Leveling processing unit 112 sets, as the leveling work route, a route along which the windrow measured by position measurement unit 102 is located within a work range of blade 42 of work vehicle 100.

Next, work vehicle 100 sets the blade (Step S13). Leveling processing unit 112 instructs work implement control unit 114 to set the blade. According to the instruction from leveling processing unit 112, work implement control unit 114 adjusts at least one of the inclination angle of the blade, movement of the blade in the right/left direction, and the blade angle in leveling work route S1. As one example, work implement control unit 114 adjusts the blade angle so that a region that is dug into the ground on the left side of work vehicle 100 is filled again by the leveling work for flattening windrow WR. The blade angle is adjusted such that a right end portion of blade 42 comes in the fore direction, and a left end portion of blade 42 comes in the aft direction with respect to the traveling direction of work vehicle 100.

Next, work vehicle 100 starts autonomous traveling (Step S14). Leveling processing unit 112 instructs travel control unit 113 to perform autonomous travel along leveling work route S1. Travel control unit 113 causes work vehicle 100 to travel along leveling work route S1.

Next, work vehicle 100 determines whether or not work along the leveling work route has been completed (Step S15). Travel control unit 113 carries out autonomous traveling along leveling work route S1, and notifies leveling processing unit 112 of the completion of the work when work vehicle 100 reaches an end of leveling work route S1. According to the notification from travel control unit 113, leveling processing unit 112 can determine that the work along the leveling work route has been completed.

Next, work vehicle 100 determines whether or not the process has been completed (Step S16). Work vehicle 100 determines whether or not the grading work for land grading area AR has been completed.

In Step S16, if it is determined that the process has been completed (YES in Step S16), work vehicle 100 terminates the land grading process (End).

On the other hand, in Step S16, when it is determined that the process has not been completed (NO in Step S16), work vehicle 100 sets the next excavation point (Step S17). Leveling processing unit 112 instructs position control unit 115. Position control unit 115 sets the excavation point based on the obtained information. As one example, position control unit 115 sets next point P1 as the excavation point.

Then, the process returns to Step S4, and the above processes are repeated. Position control unit 115 instructs travel control unit 113 to move to point P1 as the next excavation point. Travel control unit 113 executes, based on point P1 set by position control unit 115 and the information obtained by GNSS receiver 109, autonomous travel control for driving and moving at least one of front wheels 11 and/or rear wheels 12 to move work vehicle 100 to point P1. The process after this step is the same, and details for these parts will not be described repeatedly.

With the above described method, it is possible to measure a windrow produced by the grading work, and to set the leveling work route by the blade of the motor grader to a route including the windrow measured by position measurement unit 102. Then, by autonomously traveling along the leveling work route, it is possible to appropriately perform the land grading (leveling process) of the windrow produced by the grading work.

While in this example, the method for measuring a windrow produced by grading work by position measurement unit 102 attached to work vehicle 100 is described, position measurement unit 102 is not required to be attached to work vehicle 100, and the windrow may be measured by a different device. Specifically, position measurement unit 102 may be attached to another external measurement vehicle such as a dump truck to measure a windrow. Alternatively, position measurement unit 102 may be attached to an unmanned aircraft vehicle such as a drone to measure a windrow.

Further, while in this example, the method for setting the excavation work route and the leveling work route by excavation processing unit 111 and leveling processing unit 112 of CPU 104 of work vehicle 100 is described, the present invention is not particularly limited to this example, and CPU 12 of base station 10 that is provided so as to be capable of communicating with work vehicle 100 may execute these processes, and work vehicle 100 may execute the excavation work and the leveling work according to the instruction from base station 10. Further, another external server that is provided so as to be capable of communicating with work vehicle 100 may execute these processes.

MODIFIED EXAMPLE

As a modified example of the first embodiment, a method for controlling the blade according to a condition of the windrow will be described.

Figure 11:
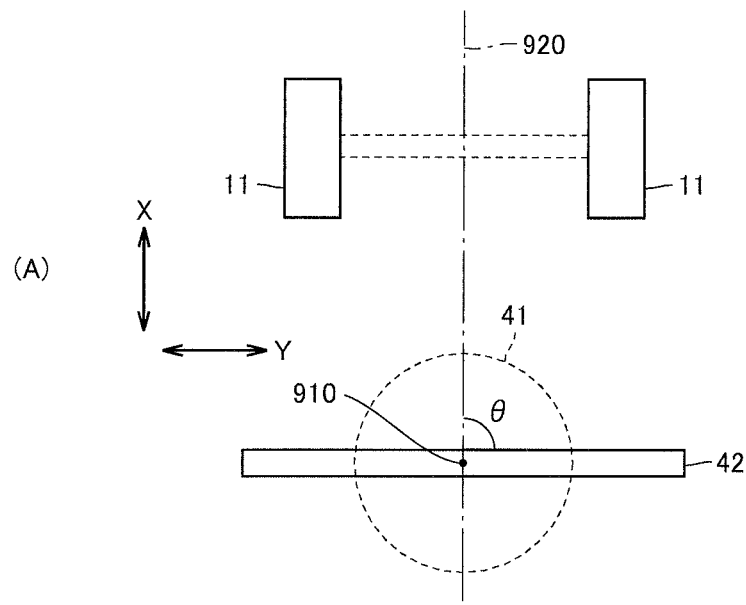
FIG. 11 shows views illustrating blade angles according to a modified example of the first embodiment.
Figure 11:
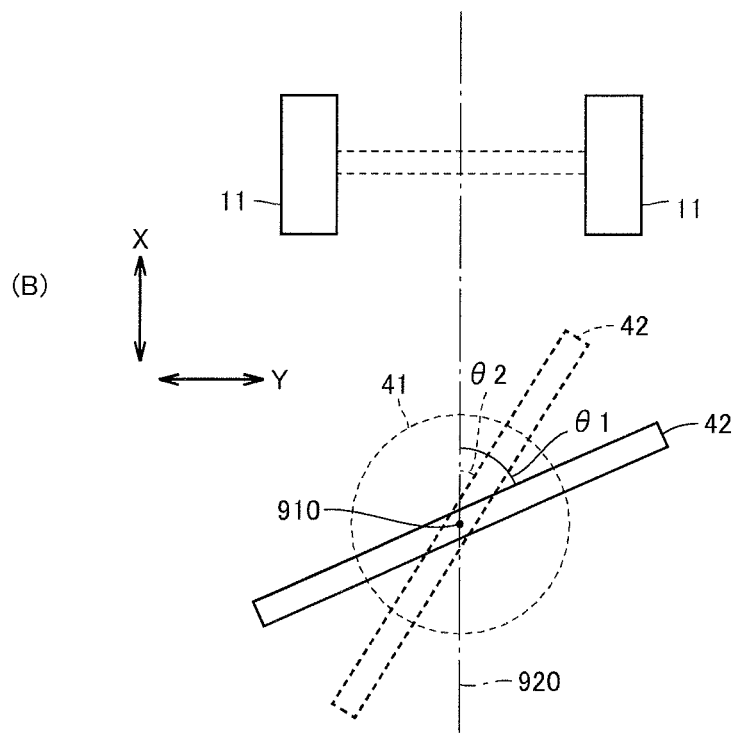

FIG. 11 shows views illustrating blade angles according to the modified example of the first embodiment.

As illustrated in FIGS. 11(A) and 11(B), blade 42 rotate centering a rotational axis 910 by swing driving of swing circle 41.

Note that, a case in which an angle of blade 42 is controlled so that a right end of blade 42 comes before a left end thereof will be described.

Front wheels 11 are coupled to an axle shaft. The axle shaft is orthogonal to a central axis 920 of front frame 22.

A blade angle θ is an angle between the traveling direction of the vehicular body and blade 42. Precisely, blade angle θ is an angle between the traveling direction of the vehicular body when work vehicle 100 travels straight (fore direction) and blade 42. Blade angle θ can be also referred to as an angle between central axis 920 of front frame 22 and blade 42. Normally, blade angle θ is set from 45 degrees to 60 degrees. Note that, a range of blade angle θ is assumed to be greater than or equal to 0 degrees and less than or equal to 90 degrees.

In this example, blade angle θ is adjusted according to a load based on an amount of windrow WR. Specifically, when the load upon blade 42 is large, blade angle θ is set to be small. On the other hand, when the load upon blade 42 is small, blade angle θ is set to be large.

Figure 12:
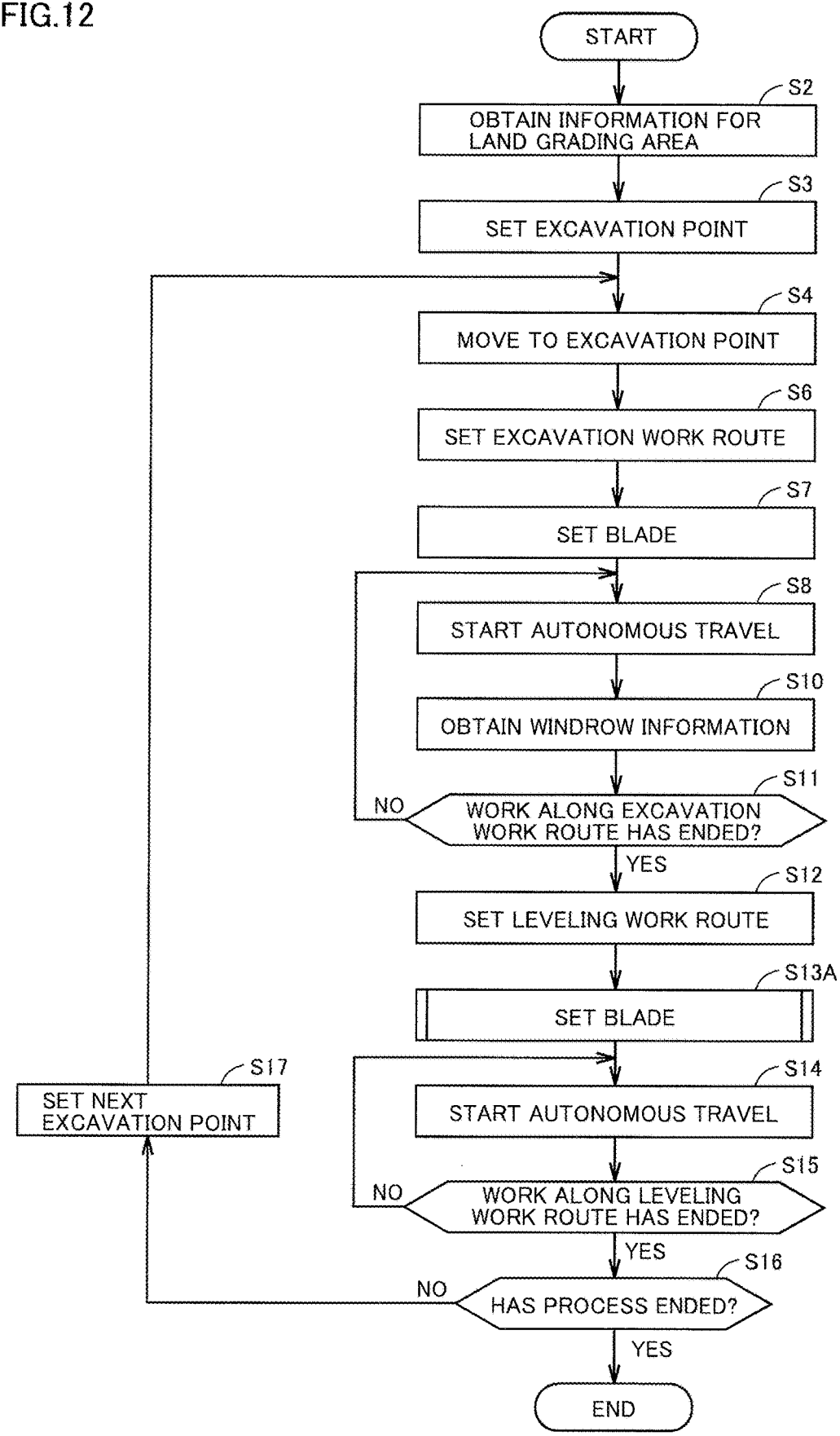
FIG. 12 is a diagram illustrating a flow for carrying out a land grading process by work vehicle 100 according to the modified example of the first embodiment.

FIG. 12 is a diagram illustrating a flow for carrying out a land grading process by work vehicle 100 according to the modified example of the first embodiment.

The flowchart shown in FIG. 12 is different from the flowchart shown in FIG. 10 in that the blade setting in Step S13 is replaced by Step S13A. Other parts of the flow are the same, and details for these parts will not be described repeatedly.

Figure 13:
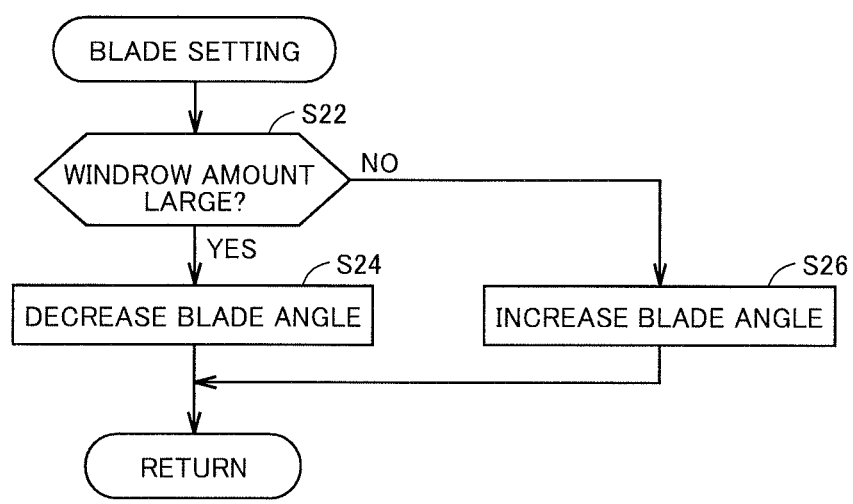
FIG. 13 is a flowchart illustrating a subroutine for blade setting according to the modified example of the first embodiment.

FIG. 13 is a flowchart illustrating a subroutine for blade setting according to the modified example of the first embodiment.

As illustrated in FIG. 13, it is determined whether or not a windrow amount is large (Step S22). Whether or not the windrow amount is large is determined based on the information of windrow WR measured by position measurement unit 102. Specifically, work implement control unit 114 can determine whether or not the windrow amount is large by measuring a width of windrow WR measured by position measurement unit 102. For example, it is determined that the windrow amount is large when the width of windrow WR is wide, and it is determined that the windrow amount is small when the width of windrow WR is determined to be narrow.

Further, whether or not the windrow amount is large may be determined by considering a height of windrow WR. For example, based on the height of windrow WR, the windrow amount may be determined to be large when the windrow is high, and the windrow amount may be determined to be small when the windrow is low. Alternatively, whether or not the windrow amount is large may be determined based on both of the height and the width of windrow WR.

In Step S22, when it is determined that the windrow amount is large, the blade angle is decreased (Step S24). Then, the process is completed (Return).

On the other hand, in Step S22, when it is determined that the windrow amount is not large, the blade angle is increased (Step S26). Then, the process is completed (Return).

With the above method, the blade angle is adjusted according to the windrow amount. When the windrow amount is large, it is possible to reduce the load upon blade 42 by decreasing the blade angle. When the windrow amount is small, a range of land grading may be expanded by increasing blade angle. It is possible to perform grading work efficiently according to the load.

While in this example, the case in which the blade angle is adjusted based on the measured windrow amount is described, this method is not limited to the blade angle, and may be employed for adjustment control of the blade such as the inclination angle of the blade and movement of the blade in the right/left direction.

Second Embodiment

In the first embodiment described above, the method for performing grading work by work vehicle 100 measuring the windrow and setting the work route based on the measured windrow is described.

In a second embodiment, a case in which information relating to the windrow is used by another device will be described.

Figure 14:
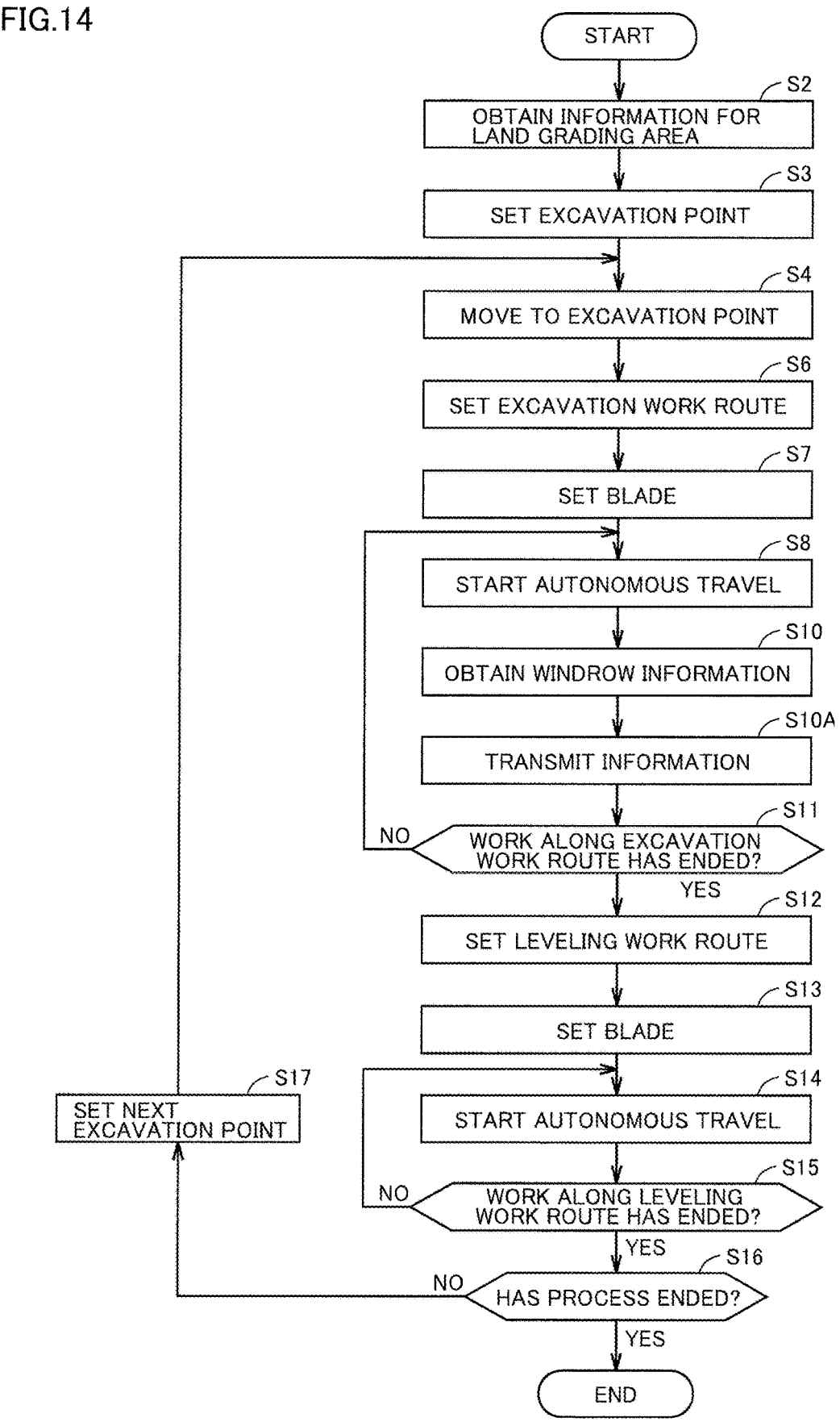
FIG. 14 is a flowchart for carrying out a land grading process by work vehicle 100 according to a second embodiment.

FIG. 14 is a flowchart for carrying out a land grading process by work vehicle 100 according to the second embodiment.

The flowchart shown in FIG. 14 is different from the flowchart shown in FIG. 10 in that Step S10A is further provided. Other parts of the flow are the same, and details for these parts will not be described repeatedly.

In Step S10A, work vehicle 100 transmits information relating to the windrow (windrow information) that has been obtained to an external device. Then, the process moves to Step S11. Other parts are the same as described with reference to FIG. 10, and details for these parts will not be described repeatedly.

In Step S10A, excavation processing unit 111 transmits the windrow information measured by position measurement unit 102 to the external device via communication unit 108. In this example, as an example of the external device, the information is transmitted to dump truck 200 illustrated in FIG. 1 that travels around the surrounding area. Note that, the windrow information includes information relating to a position at which the windrow is produced.

With this, dump truck 200 obtains the windrow information transmitted from work vehicle 100. By obtaining the windrow information, dump truck 200 can grasp the position at which the windrow is produced. Therefore, dump truck 200 can set a traveling area excluding the area in which the windrow is produced. For example, it is possible to call an attention of an operator of dump truck 200 so as not to travel through the area by showing the information relating to the windrow in a display.

Alternatively, when dump truck 200 is an unmanned dump truck that travels unattended, it is possible to perform grading work efficiently by obtaining the windrow information and setting the travel route again so as not to travel through the area.

Note that, the information may be transmitted, not limited to dump truck 200, but to base station 10, and then transmitted from base station 10 to dump truck 200.

While in this example, the configuration in which the windrow information is obtained, and the obtained windrow information is transmitted to the external device is described, the windrow information may be transmitted to the external device every predetermined period. With this, it is possible to reduce a load in communication.

Further, while in this example, the case in which the windrow information is transmitted to the dump truck as the external device is described, the information may be transmitted to a different work vehicle as the external device.

Figure 15:
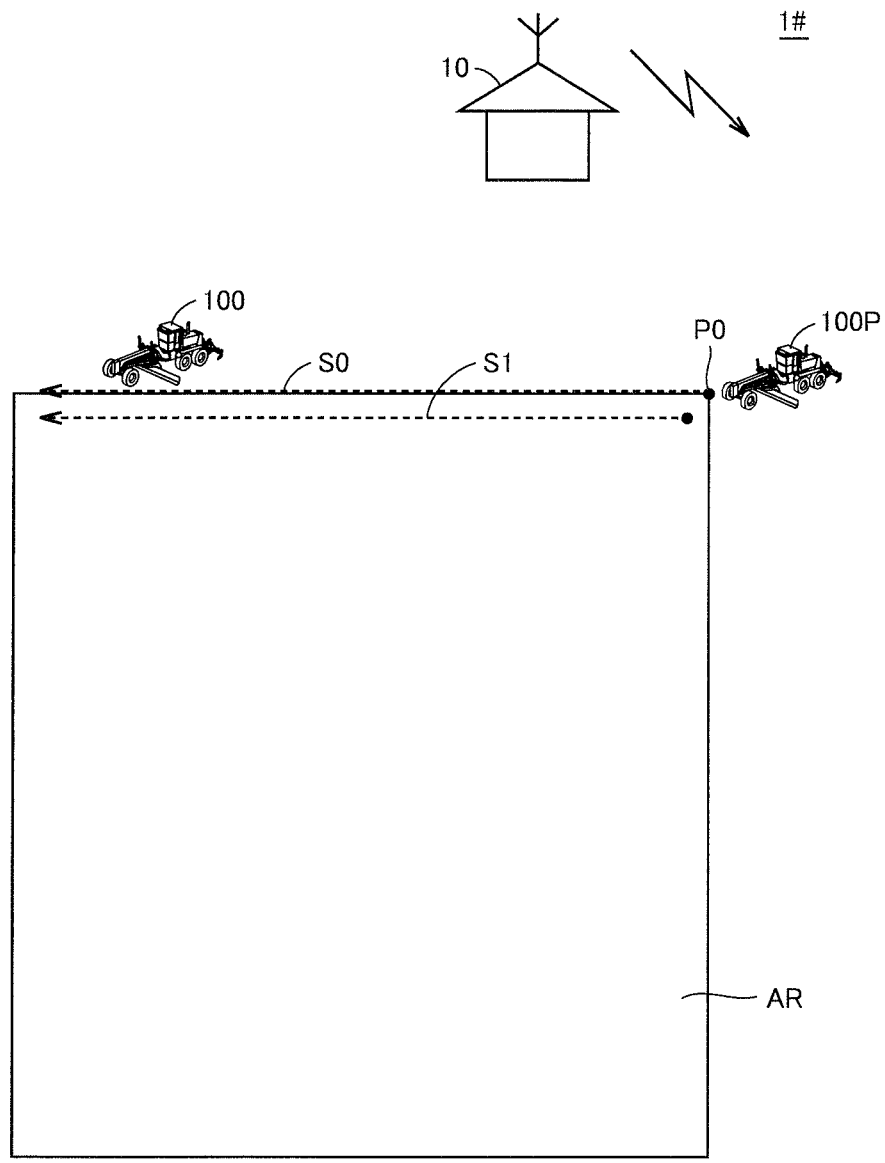
FIG. 15 is a diagram illustrating an outline of a control system 1 #of a work vehicle according to the second embodiment.

FIG. 15 is a diagram illustrating an outline of a control system 1 #of a work vehicle according to the second embodiment.

As illustrated in FIG. 15, control system 1 #of the work vehicle includes base station 10, work vehicle 100, and a work vehicle 100P. There is also shown land grading area AR, and in this example, work vehicle 100 performs grading work taking each of points P0, P1, P2, and P3 in land grading area AR as the point of origin. A position of each of points P0, P1, P2, and P3 in land grading area AR is set based on information from base station 10.

In this example, grading work is performed by a plurality of work vehicles.

For example, work vehicle 100 starting grading work at point P0 performs the grading work along work route S0.

Then, work vehicle 100 transmits information on a windrow produced by grading work to work vehicle 100P. Work vehicle 100P sets the work route S1 based on the information on the windrow produced by grading work by work vehicle 100, and performs the grading work along work route S1 that has been set.

By this method, it is possible to perform the grading work in land grading area AR quickly. This also applies to the other points.

Other Embodiment

In the first embodiment described above, the method with which work vehicle 100 alternately repeats excavation work and leveling work in the grading work is described. On the other hand, instead of alternately repeating the excavation work and the leveling work, excavation work may be performed over an entire area of land grading area AR, and then leveling work may be performed to windrows produced in land grading area AR.

Figure 16:
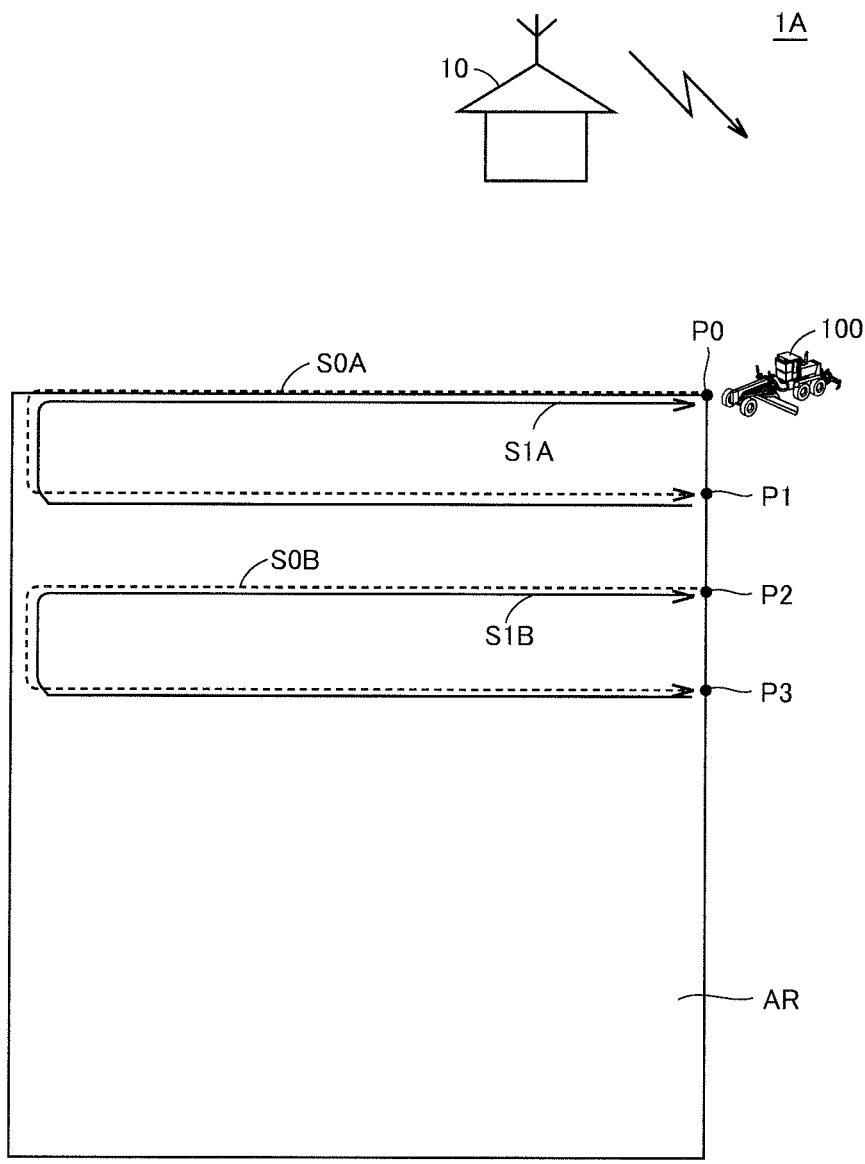
FIG. 16 is a diagram illustrating an outline of a control system 1A of a work vehicle according to the other embodiment.

FIG. 16 is a diagram illustrating an outline of a control system 1A of a work vehicle according to other embodiment.

As illustrated in FIG. 16, control system 1A of the work vehicle includes base station 10 and work vehicle 100. There is also shown land grading area AR, and in this example, work vehicle 100 performs grading work taking each of points P0, P1, P2, and P3 in land grading area AR as a reference. A position of each of points P0, P1, P2, and P3 in land grading area AR is set based on information from base station 10.

While positions of points P0 to P3 are shown in this example, it is assumed that many more points are provided.

In this example, grading work is performed by a single work vehicle.

Excavation processing unit 111 executes a process relating to grading work of land grading area AR, taking point P0 as a point of origin. Specifically, taking point P as a point of origin, excavation processing unit 111 sets excavation work routes S0A, S0B, . . . in land grading area AR. Excavation processing unit 111 instructs travel control unit 113 to move along excavation work routes S0A and S0B that has been set.

For example, one work vehicle 100 starting grading work (excavation work) at point P0 performs the grading work (excavation work) along excavation work route S0A to point P1. Further, another work vehicle 100 starting grading work (excavation work) at point P2 performs the grading work (excavation work) along excavation work route S0B to point P3. This grading work (excavation work) is repeated, and the grading work (excavation work) is repeated in land grading area AR as a whole.

With this, windrows are formed over land grading area AR as a whole by the grading work (excavation work). Work vehicle 100 obtains information of the windrows produced by the grading work (excavation work).

When it is determined that traveling along excavation work routes S0A and S0B, . . . in land grading area AR as a whole is completed based on the position information from GNSS receiver 109, excavation processing unit 111 instructs leveling processing unit 112 to carry out leveling work.

Leveling processing unit 112 sets leveling work routes S1A and S1B, . . . in land grading area AR taking one of points P as an ending point, based on the obtained windrow information. Leveling processing unit 112 instructs travel control unit 113 to move along leveling work routes S1A and S1B that have been set.

Travel control unit 113 causes work vehicle 100 to travel along leveling work routes S1A and S1B, . . . that have been set by leveling processing unit 112.

Leveling processing unit 112 instructs work implement control unit 114, and work implement control unit 114 adjusts, according to the instruction from leveling processing unit 112, at least one of the inclination angle of the blade, movement of the blade in the right/left direction, and the blade angle in leveling work route S1.

The leveling work described above is performed by work vehicle 100 traveling along leveling work routes S1A and S1B.

With this, grading work (leveling work) for land grading area AR as a whole is sequentially performed.

The grading work (excavation work) over land grading area AR as a whole is performed, windrows produced by the excavation work are measured, and a route including the windrows produced in land grading area AR as a whole are set as the leveling work route. Then, by autonomously travel along the leveling work route, it is possible to perform appropriately land grading (leveling process) of the windrows produced by grading work.

<Effects>

Next, effects of the present embodiment will be described.

Referring to FIG. 9, the control system for work vehicle 100 having work implement 4 according to the present embodiment is provided with position measurement unit 102, leveling processing unit 112, and travel control unit 113. Position measurement unit 102 measures windrow WR produced by excavation work in grading work. Leveling processing unit 112 sets a route including windrow WR measured by position measurement unit 102 for the leveling work route by blade 42 of work implement 4. Travel control unit 113 controls work vehicle 100 to travel along the leveling work route set by leveling processing unit 112.

For the leveling work route, as a route including windrow WR measured by position measurement unit 102 is set, it is possible to appropriately perform land grading of a windrow produced by excavation work in grading work.

As illustrated in FIG. 2, work vehicle 100 is provided with position measurement unit 102.

By providing position measurement unit 102 for work vehicle 100, it is possible to easily measure windrow produced by excavation work.

Leveling processing unit 112 sets a route along which the windrow measured by position measurement unit 102 is located within a work range of blade 42 of work implement 4 for the leveling work route by blade 42 of work implement 4.

As the windrow is included in the work range of blade 42, it is possible to reliably flatten the windrow.

As illustrated in FIG. 9, the control system for work vehicle 100 according to the present embodiment is provided with work implement control unit 114. Work implement control unit 114 controls blade 42 of work implement 4 based on windrow WR measured by position measurement unit 102 for the leveling work route set by leveling processing unit 112.

As work implement control unit 114 controls blade 42 of work vehicle 100 based on windrow WR measured by position measurement unit 102 for the leveling work route set by leveling processing unit 112, it is possible to perform grading work according to the condition of windrow WR.

Work implement control unit 114 controls blade 42 of work implement 4 based on the width of windrow WR measured by position measurement unit 102.

With work implement control unit 114, based on the width of windrow WR measured by position measurement unit 102, it is determined that the windrow amount is large when the width of windrow WR is wide, and it is determined that the windrow amount is small when the width of windrow WR is determined to be narrow. Therefore, it is possible to perform grading work more efficiently by controlling blade 42 according to the load upon blade 42.

Work implement control unit 114 controls blade 42 of work implement 4 based on the height of windrow WR measured by position measurement unit 102.

With work implement control unit 114, based on the height of windrow WR measured by position measurement unit 102, it is determined that the windrow amount is large when the height of windrow WR is high, and it is determined that the windrow amount is small when the height of windrow WR is determined to be low. Therefore, it is possible to perform grading work more efficiently by controlling blade 42 according to the load upon blade 42.

As illustrated in FIG. 9, the control system for work vehicle 100 according to the present embodiment is provided with communication unit 108. Communication unit 108 transmits the information relating to the windrow measured by position measurement unit 102 to the external device.

As communication unit 108 transmits the information relating to the windrow to the external device, the external device receives the information. By the external device performing control based on the received information relating to the windrow, it is possible to perform grading work efficiently.

CPU 12 for controlling work vehicle 100 having work implement 4 according to the present embodiment performs the steps of: measuring windrow WR produced by excavation work by blade 42 of work implement 4; setting, for the leveling work route by work implement 4, the route including windrow WR that has been measured; and controlling work vehicle 100 to travel along the leveling work route that has been set.

As the route including windrow WR that has been measured is set for the leveling work route, it is possible to appropriately perform land grading of the windrow produced by excavation work in grading work.

In the step of setting the route, CPU 12 sets the work route along which windrow WR that has been measured is located within the work range of blade 42 of work implement 4 for the leveling work route by blade 42 of work implement 4.

By including the windrow within the work range of blade 42, it is possible to reliably flatten the windrow.

CPU 12 performs the step of: controlling blade 42 of work implement 4 based on the windrow that has been measured for the leveling work route by blade 42 of work implement 4.

As blade 42 of work implement 4 is controlled based on windrow WR that has been measured for the leveling work route, it is possible to perform grading work according to the condition of windrow WR.

In the step of controlling blade 42 of work implement 4, CPU 12 performs the step of controlling blade 42 of work implement 4 based on the width of the windrow that has been measured.

With CPU 12, based on the width of windrow WR that has been measured, it is determined that the windrow amount is large when the width of windrow WR is wide, and it is determined that the windrow amount is small when the width of windrow WR is determined to be narrow. Therefore, it is possible to perform grading work more efficiently by controlling blade 42 according to the load upon blade 42.

In the controlling blade 42 of work implement 4, CPU 12 performs the step of controlling blade 42 of work implement 4 based on the height of the windrow that has been measured.

With CPU 12, based on the height of windrow WR that has been measured, it is determined that the windrow amount is large when the height of windrow WR is high, and it is determined that the windrow amount is small when the height of windrow WR is determined to be low. Therefore, it is possible to perform grading work more efficiently by controlling blade 42 according to the load upon blade 42.

CPU 12 performs the step of transmitting the information relating to the windrow that has been measured to the external device.

As the information relating to the windrow is transmitted to the external device, the external device receives the information. By the external device performing control based on the received information relating to the windrow, it is possible to perform grading work efficiently.

Work vehicle 100 according to the present embodiment includes: work implement 4; position measurement unit 102 for measuring the windrow produced by grading work; leveling processing unit 112 for setting, for the work route by work implement 4, a route including the windrow measured by position measurement unit 102; and travel control unit 113 for controlling work vehicle 100 to travel along the work route that has been set by leveling processing unit 112.

As the route including windrow WR that has been measured by position measurement unit 102 is set for the leveling work route, it is possible to appropriately perform land grading of the windrow produced by excavation work in grading work.

As illustrated in FIG. 2, work vehicle 100 is provided with position measurement unit 102.

By providing position measurement unit 102 for work vehicle 100, it is possible to easily measure windrow produced by excavation work.

Leveling processing unit 112 sets a route along which the windrow measured by position measurement unit 102 is located within a work range of blade 42 of work implement 4 for the leveling work route by blade 42 of work implement 4.

As the windrow is included in the work range of blade 42, it is possible to reliably flatten the windrow.

As illustrated in FIG. 9, work vehicle 100 according to the present embodiment is provided with work implement control unit 114. Work implement control unit 114 controls blade 42 of work implement 4 based on windrow WR measured by position measurement unit 102 for the leveling work route set by leveling processing unit 112.

As work implement control unit 114 controls blade 42 of work vehicle 100 based on windrow WR measured by position measurement unit 102 for the leveling work route set by leveling processing unit 112, it is possible to perform grading work according to the condition of windrow WR.

Work implement control unit 114 controls blade 42 of work implement 4 based on the width of windrow WR measured by position measurement unit 102.

With work implement control unit 114, based on the width of windrow WR measured by position measurement unit 102, it is determined that the windrow amount is large when the width of windrow WR is wide, and it is determined that the windrow amount is small when the width of windrow WR is determined to be narrow. Therefore, it is possible to perform grading work more efficiently by controlling blade 42 according to the load upon blade 42.

Work implement control unit 114 controls blade 42 of work implement 4 based on the height of windrow WR measured by position measurement unit 102.

With work implement control unit 114, based on the height of windrow WR measured by position measurement unit 102, it is determined that the windrow amount is large when the height of windrow WR is high, and it is determined that the windrow amount is small when the height of windrow WR is determined to be low. Therefore, it is possible to perform grading work more efficiently by controlling blade 42 according to the load upon blade 42.

As illustrated in FIG. 9, work vehicle 100 according to the present embodiment is provided with communication unit 108. Communication unit 108 transmits the information relating to the windrow measured by position measurement unit 102 to the external device. As communication unit 108 transmits the information relating to the windrow to the external device, the external device receives the information.

By the external device performing control based on the received information relating to the windrow, it is possible to perform grading work efficiently.

The embodiments disclosed herein are for exemplary purposes, and not limited to the above described examples. The scope of the present invention is defined by the appended claims, and includes any modifications made that are equivalent to or fall within the scope of the claims.

REFERENCE SIGNS LIST 1, 1#: Control system of work vehicle, 2: Vehicular body frame, 4: Work implement, 6: Engine compartment, 10: Base station, 11: Front wheel, 12: Rear wheel, 14, 106: Storage unit, 16, 108: Communication unit, 21: Rear frame, 22: Front frame, 25: Exterior cover, 40: Drawbar, 41: Swing circle, 42: Blade, 44, 45: Lift cylinder, 46: Drawbar shift cylinder, 47: Blade shift cylinder, 48: Tilt cylinder, 49: Hydraulic motor, 100, 100P: Work vehicle, 102: Position measurement unit, 111: Excavation processing unit, 112: Leveling processing unit, 113: Travel control unit, 114: Work implement control unit, 115: Position control unit, 200: Dump truck

The invention claimed is:

1. A control system for a work vehicle, the control system comprising:
 a position measurement unit for measuring a position of a windrow produced by grading work;
 a work route setting unit for setting a work route based on the position of the windrow that has been measured by the position measurement unit; and
 a travel control unit for controlling the work vehicle to travel along the work route that has been set by the work route setting unit.

2. The control system for a work vehicle according to claim 1, wherein the position measurement unit is provided in the work vehicle.

3. The control system for a work vehicle according to claim 1, wherein the work route setting unit sets a work route along which the position of the windrow is located within a work range of the work implement.

4. The control system for a work vehicle according to claim 1, further comprising a work implement control unit for controlling the work implement along the work route set by the work route setting unit, based on the position of the windrow that has been measured by the position measurement unit.

5. The control system for a work vehicle according to claim 4, wherein
 the position measurement unit further measures a width of the windrow, and
 the work implement control unit controls the work implement based on the width of the windrow.

6. The control system for a work vehicle according to claim 4, wherein
 the position measurement unit further measures a height of the windrow, and
 the work implement control unit controls the work implement based on the height of the windrow.

7. The control system for a work vehicle according to claim 1, further comprising a communication unit for transmitting information to an external device, the information relating to the windrow that has been measured by the position measurement unit.

8. A method for controlling a control system for a work vehicle having a work implement, the method comprising the steps of:

measuring a position of a windrow produced by grading work;

setting a work route based on the position of the windrow that has been measured; and controlling the work vehicle to travel along the work route that has been set.

9. The method for controlling a control system for a work vehicle according to claim 8, wherein the step of setting the route sets a work route along which the position of the windrow is located within a work range of the work implement.

10. The method for controlling a control system for a work vehicle according to claim 8, further comprising the step of controlling the work implement along the work route having been set, based on the position of the windrow that has been measured.

11. The method for controlling a control system for a work vehicle according to claim 10, wherein the step of measuring includes a step of further measuring a width of the windrow, and the step of controlling the work implement includes a step of controlling the work implement based on the width of the windrow.

12. The method for controlling a control system for a work vehicle according to claim 10, wherein the step of measuring includes a step of further measuring a height of the windrow, and the step of controlling the work implement includes a step of controlling the work implement based on the height of the windrow.

13. The method for controlling a control system for a work vehicle according to claim 8, further comprising the step of transmitting information to an external device, the information relating to the windrow that has been measured.

14. A work vehicle comprising:

a work implement;

a position measurement unit for measuring a position of a windrow produced by grading work;

a work route setting unit for setting a work route based on the position of the windrow that has been measured by the position measurement unit; and a travel control unit for controlling the work vehicle to travel along the work route that has been set by the work route setting unit.

15. The work vehicle according to claim 14, wherein the work route setting unit sets a work route along which the position of the windrow is located within a work range of the work implement.

16. The work vehicle according to claim 14, further comprising a work implement control unit for controlling the work implement along the work route set by the work route setting unit, based on the position of the windrow that has been measured by the position measurement unit.

17. The work vehicle according to claim 16, wherein the position measurement unit further measures a width of the windrow, and the work implement control unit controls the work implement based on the width of the windrow.

18. The work vehicle according to claim 16, wherein the position measurement unit further measures a height of the windrow, and the work implement control unit controls the work implement based on the height of the windrow.

19. The work vehicle according to claim 14, further comprising a communication unit for transmitting information to an external device, the information relating to the windrow that has been measured by the position measurement unit.

* * * * *